United States Patent [19]
Earp

[11] Patent Number: 5,893,293
[45] Date of Patent: Apr. 13, 1999

[54] SINGLE SHAFT SHIFTING MECHANISM

[75] Inventor: Leonard Earp, Chester, United Kingdom

[73] Assignee: Eaton Corporation, Cleveland, Ohio

[21] Appl. No.: 08/833,453

[22] Filed: Apr. 7, 1997

[30] Foreign Application Priority Data

Apr. 4, 1996 [GB] United Kingdom .................. 9607194

[51] Int. Cl.⁶ .................................................. B60K 20/12
[52] U.S. Cl. ........................................... 74/335; 74/473.37
[58] Field of Search .................. 74/335, 339, 473.24, 74/473.37

[56] References Cited

U.S. PATENT DOCUMENTS

| | | | |
|---|---|---|---|
| 4,621,537 | 11/1986 | Piazza et al. | 74/477 |
| 4,920,815 | 5/1990 | Reynolds | 74/335 |
| 5,193,410 | 3/1993 | Stine et al. | 74/335 X |
| 5,231,895 | 8/1993 | Stine | 74/335 X |
| 5,297,453 | 3/1994 | Chene | 74/473.24 |
| 5,471,893 | 12/1995 | Newbigging | 74/335 |
| 5,544,541 | 8/1996 | Kruizenga et al. | 74/473.24 |

FOREIGN PATENT DOCUMENTS 4342957  6/1995  Germany.

*Primary Examiner*—Dirk Wright
*Assistant Examiner*—Peter T. Kwon
*Attorney, Agent, or Firm*—Howard D. Gordon

[57] ABSTRACT

A single shaft shifting mechanism (300) is provided having supports (310, 312), independent of the shift shaft (106), for supporting the weight of the shift forks (302, 304, 306) to minimize frictional contact between the shift shaft and the shift forks.

2 Claims, 6 Drawing Sheets

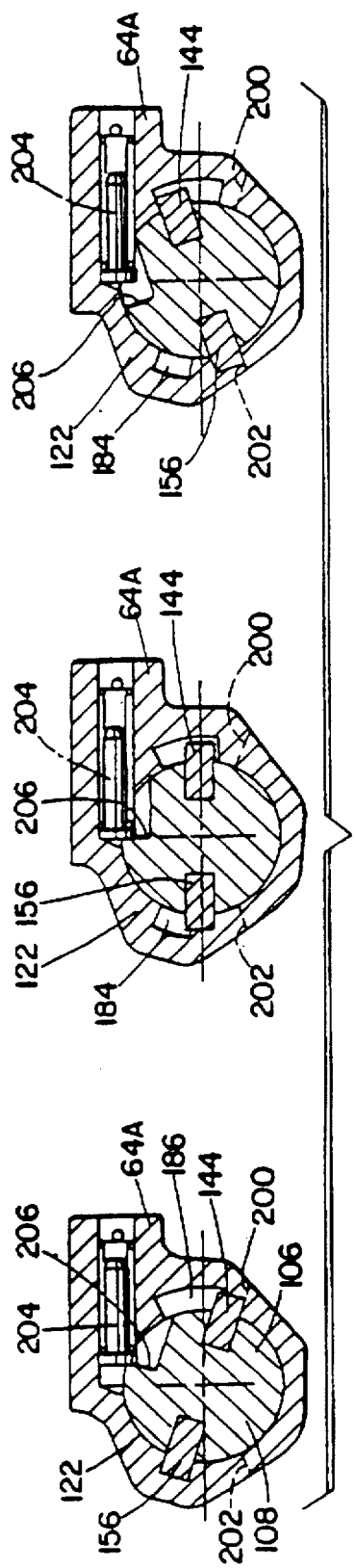
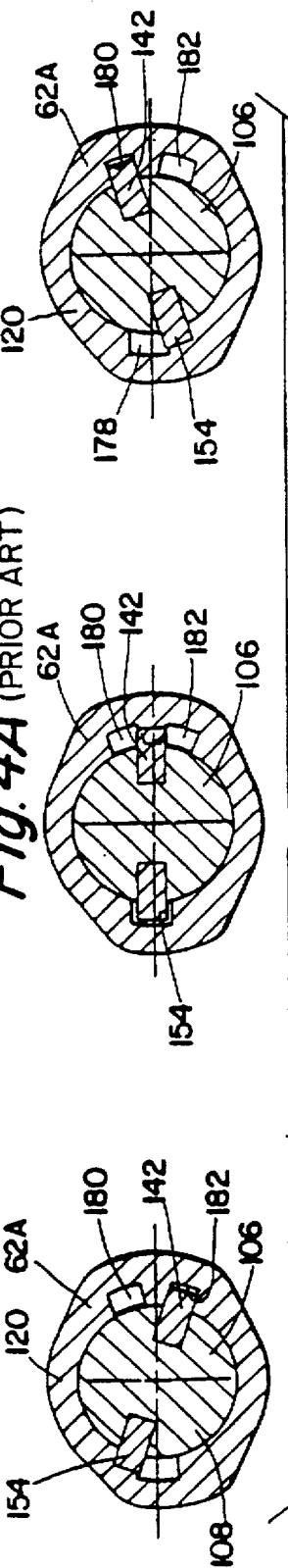
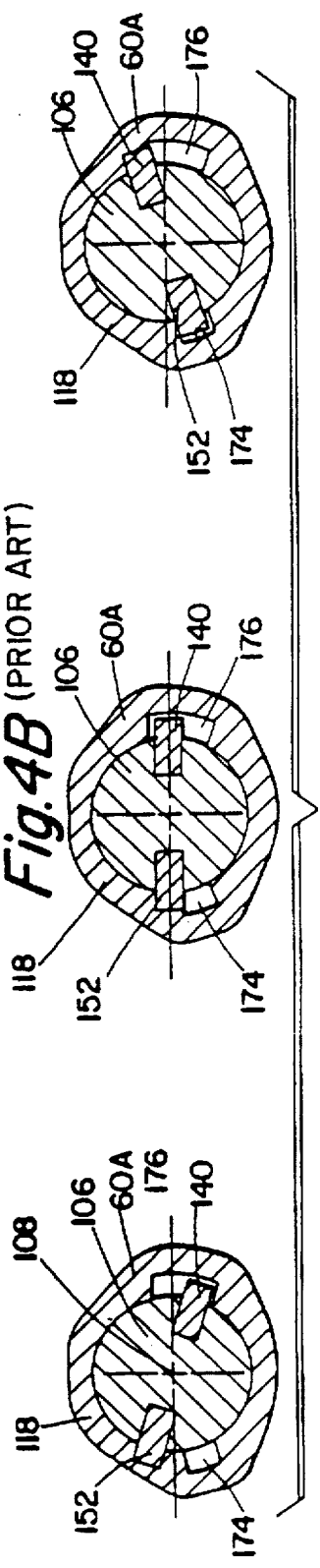
Fig. 4A (PRIOR ART)
Fig. 4B (PRIOR ART)
Fig. 4C (PRIOR ART)

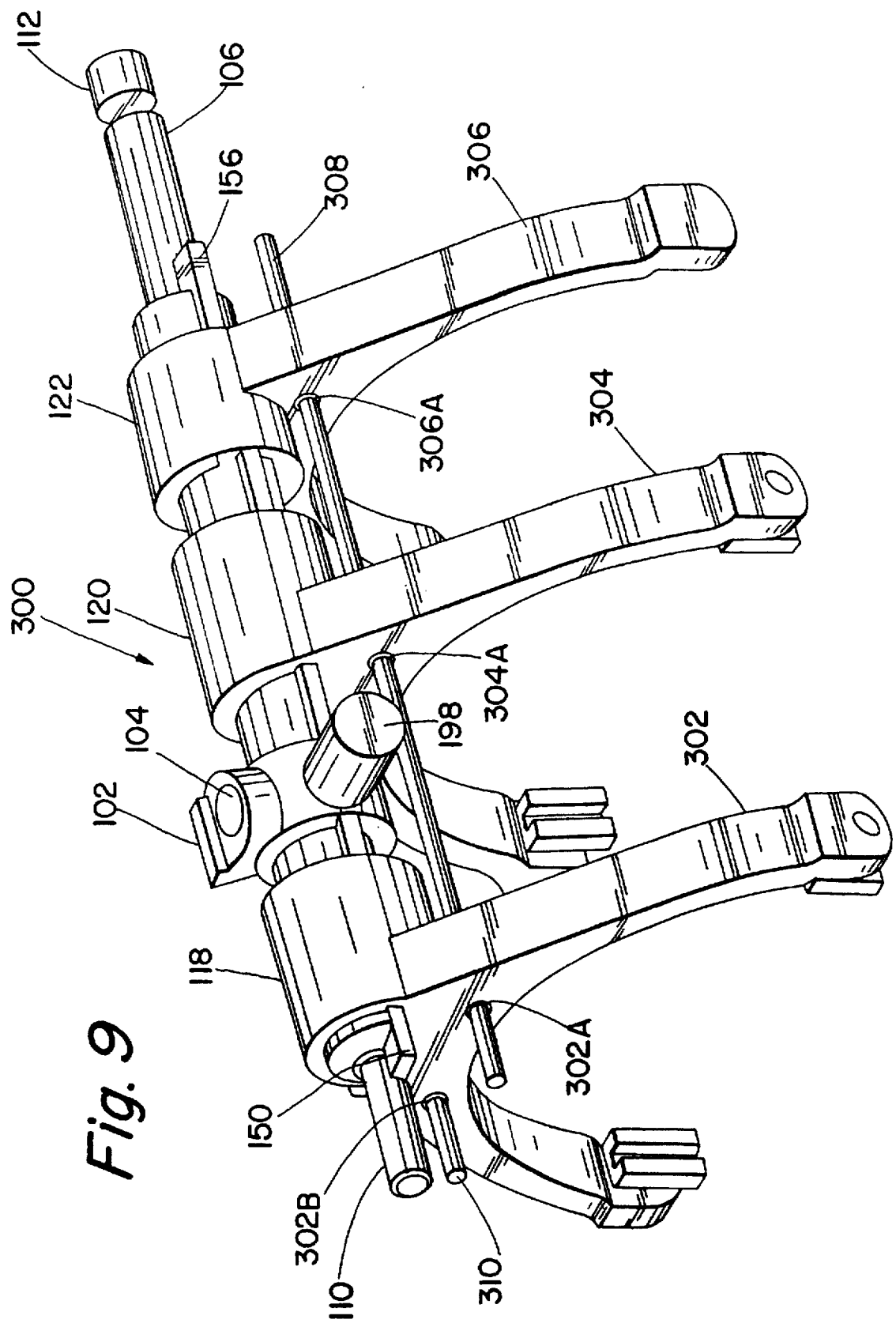

5,893,293

1

SINGLE SHAFT SHIFTING MECHANISM

RELATED APPLICATIONS

This application is related to U.S. patent application Ser. No. 08/636,097, filed Apr. 22, 1996, issued as U.S. Pat. No. 5,737,969 entitled SINGLE SHAFT SHIFTING MECHANISM, and assigned to EATON CORPORATION, the assignee of this application. This application claims priority from GB 9607194.9, filed Apr. 4, 1996.

BACKGROUND OF THE INVENTION

1. Field of the Invention

The present invention relates to single shaft shifting mechanisms of the type comprising a selectively axially and rotationally movable shift shaft and a plurality of shift forks having hubs with through bores for receiving the shaft for rotational and/or axial movement relative thereto. In particular, the present invention relates to a single shaft shifting mechanisms of the type described wherein the shift forks are partially or entirely supported by support members independent of the shift shaft to minimize frictional resistance to relative axial and/or rotational movements of the shift shaft relative to the hubs of the shift forks.

2. Description of the Prior Art

Single shaft shifting mechanisms for selectively engaging and disengaging a selected one of three or more selectable transmission ratios are known in the prior art, as may be seen by reference to U.S. Pat. Nos. 4,621,537 and 4,920,815, the disclosures of which are incorporated herein by reference.

While these prior art single shaft shifting mechanisms have been well received, they are subject to improvement, as the weight of the shift forks, in large part, are supported by the shift shaft, which may result in objectionable frictional resistance to relative rotational and/or axial movement between the shift shaft and the shift fork hubs.

SUMMARY OF THE INVENTION

In accordance with the present invention, the drawbacks of the prior art are minimized or overcome by the provision of a single shaft shifting mechanism with minimal frictional contact between the shift shaft and the shift fork hubs. The foregoing is accomplished by providing support means, independent of the shift shaft, for supporting a significant portion or all of the weight of the shift forks.

Accordingly, it is an object of the present invention to provide a new and improved single shaft shifting mechanism with minimal frictional resistance to relative rotational and/or axial movements between the shift shaft and associated shift fork hubs.

This and other objects and advantages of the present invention will become apparent from a reading of the following description of the preferred embodiment taken in connection with the attached drawings.

2

Figure 2:
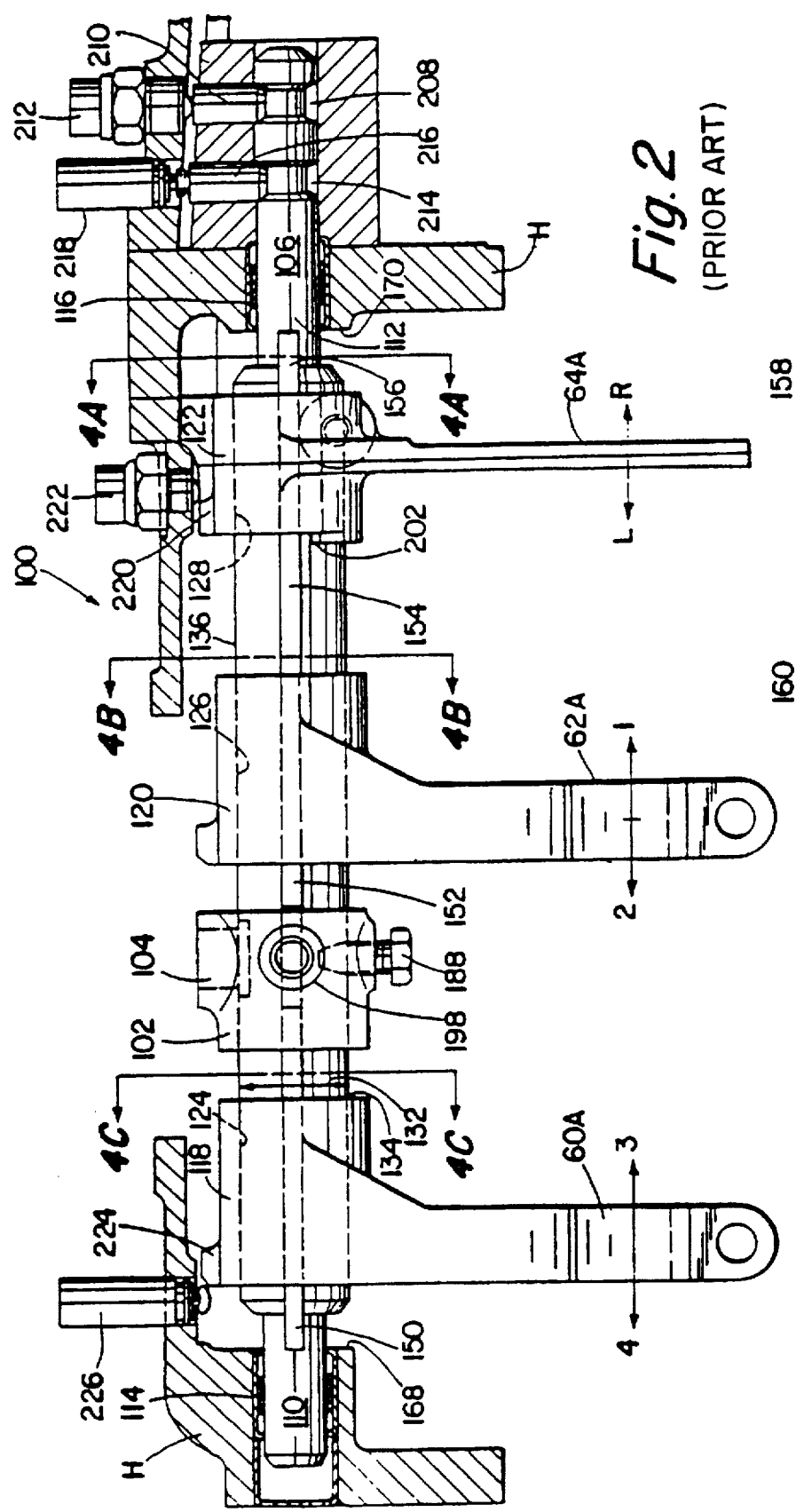
FIG. 2 is a side view of a prior art single shaft shifting mechanism of the present invention.
Figure 3:
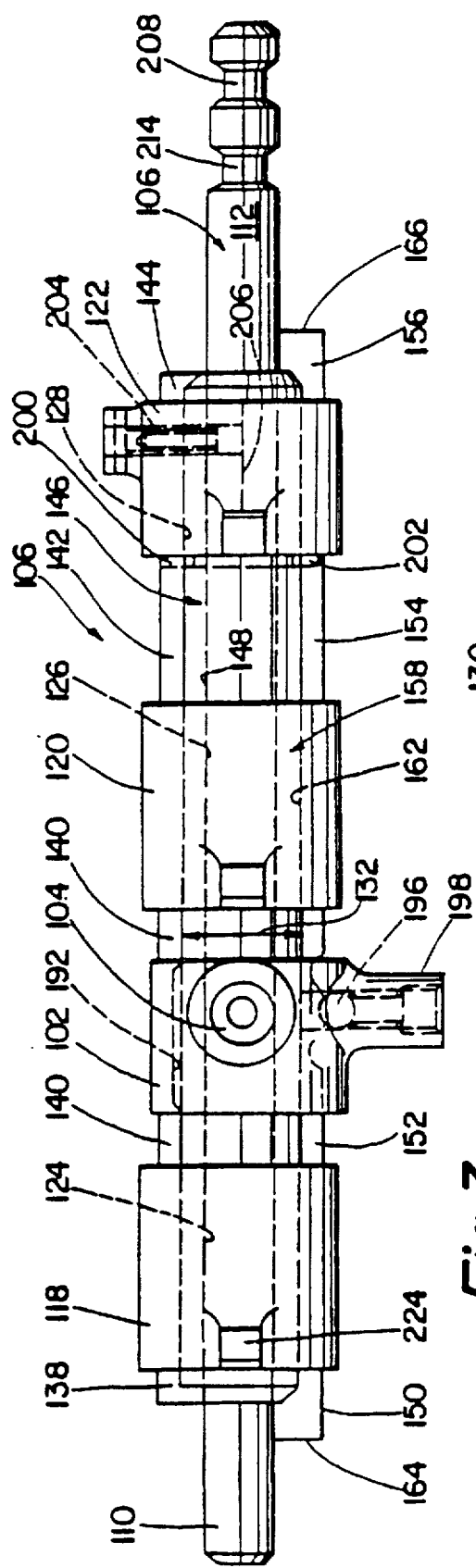

FIG. 3 is a top view of a prior art shifting mechanism of FIG. 2.

FIGS. 4A–4C are matrices showing the positions of the shaft and keys relative to the various shift hub portions for each selection position of the shifting mechanism of the prior art and of the present invention.

Figure 5:
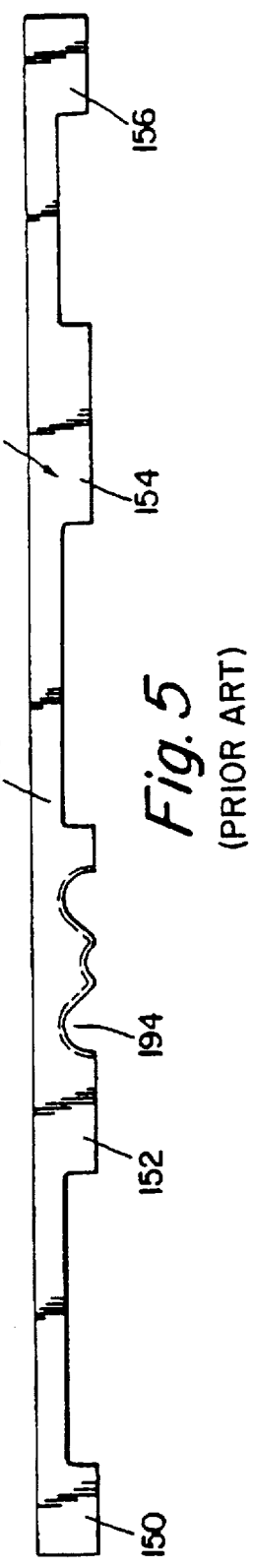

FIG. 5 is a top view of a prior art of the interlock key.

Figure 6:
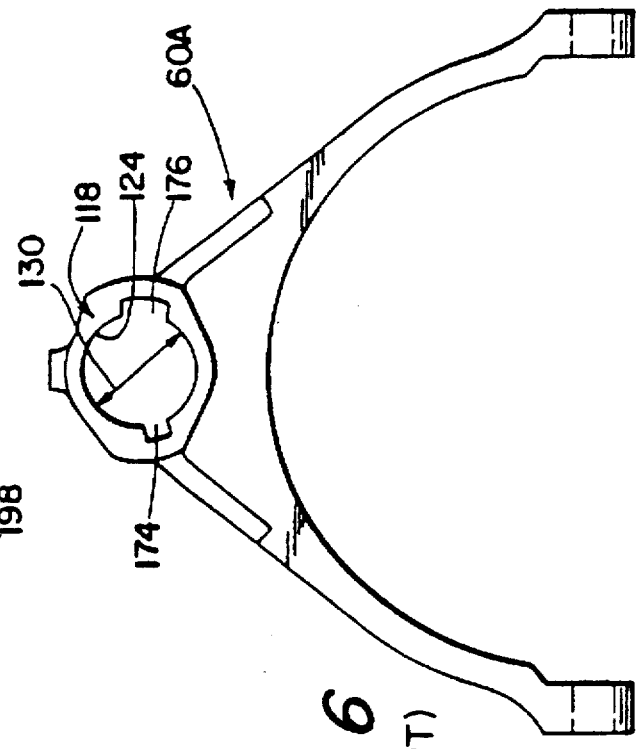

FIG. 6 is a plan view of one of a prior art of shift forks.

Figure 7A:
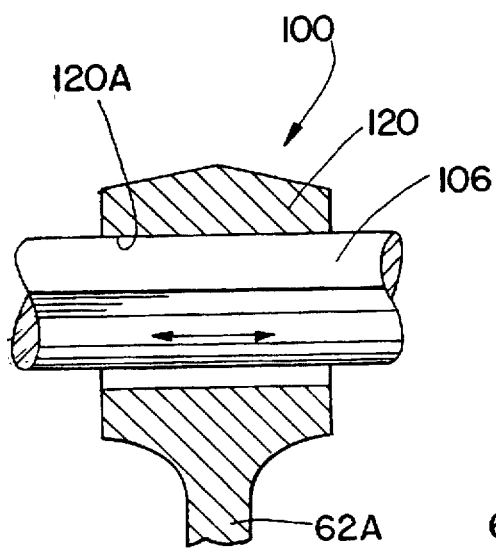
Figure 7B:
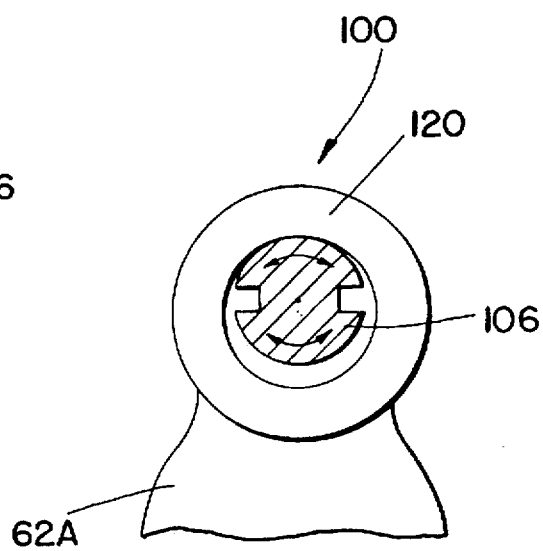

FIGS. 7A–7B are partial front and sectional views of the prior art illustrating the frictional contact between the shift shaft and associated shift yoke.

Figure 8A:
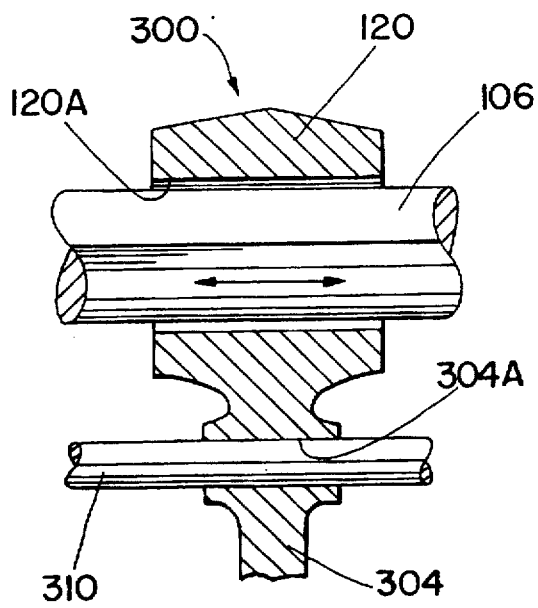
Figure 8B:
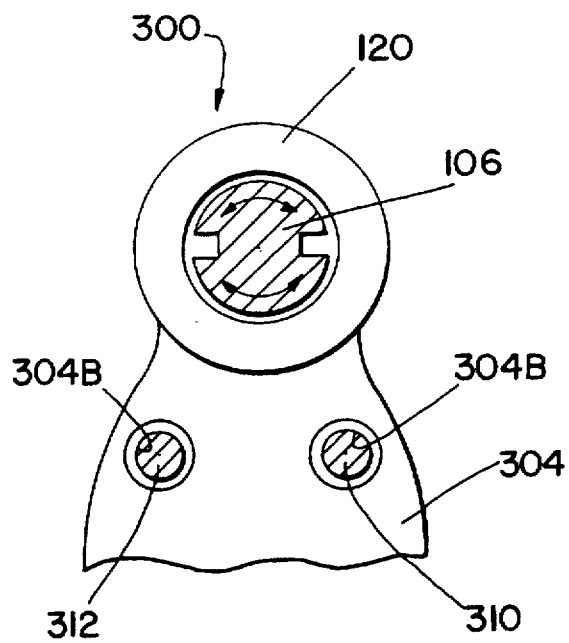

FIGS. 8A–8B are partial side and front sectional views, corresponding to FIGS. 7A–7B, of the single shaft shifting mechanism of the present invention.

FIG. 9 is a perspective view of the single shaft shifting mechanism of the present invention.

DESCRIPTION OF THE PREFERRED EMBODIMENT

Figure 1:
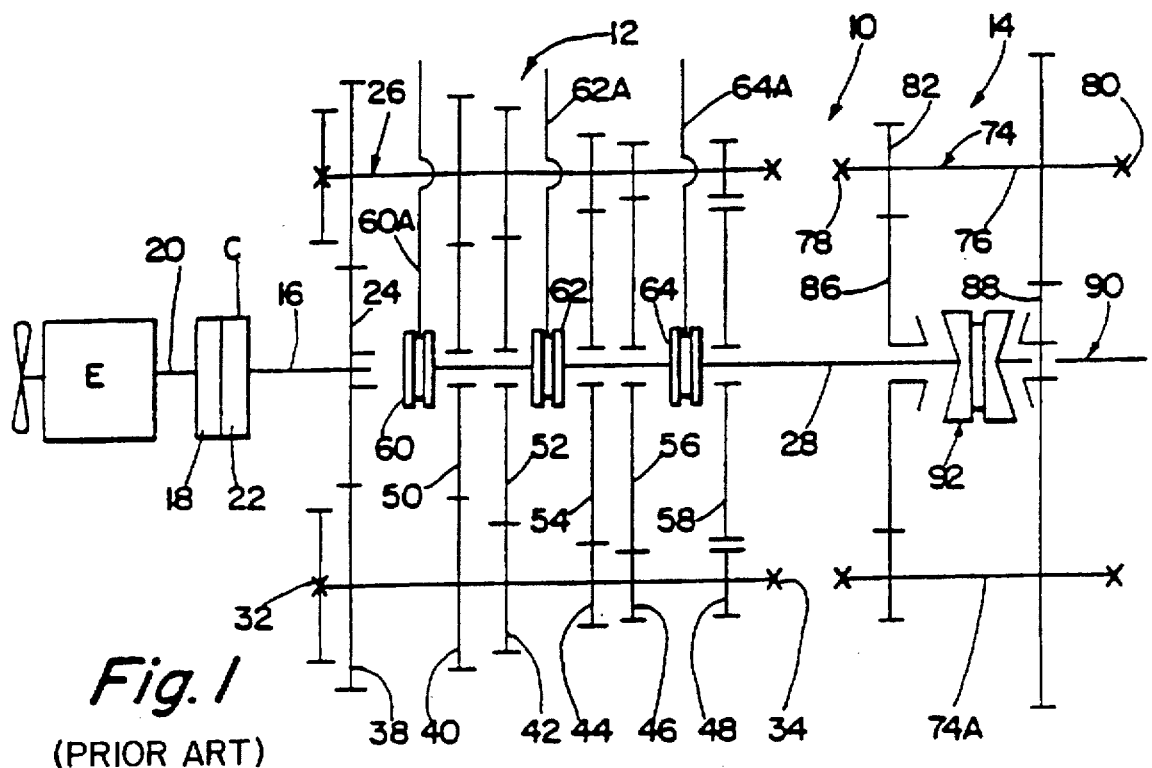
FIG. 1 is a top view schematic illustration of a compound transmission having a range-type auxiliary section and utilizing the single shaft shifting mechanism of the present invention.
Figure 1A:
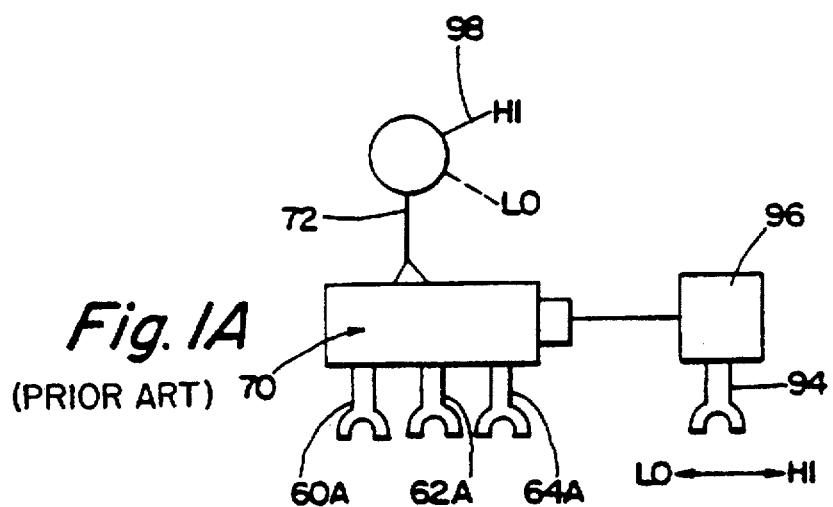
FIG. 1A is a schematic illustration of the shifting mechanism of the transmission of FIG. 1.
Figure 1B:
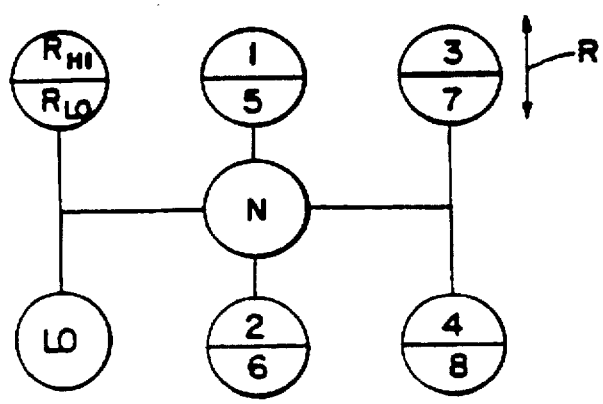
FIG. 1B is a schematic illustration of the shift pattern of the transmission of FIG. 1.

FIGS. 1, 1A and 1B illustrate a range-type compound transmission 10 with which the shifting mechanism of the prior art and of the present invention is advantageously utilized. Compound transmission 10 comprises a multiple-speed main transmission section 12 connected in series with a range-type auxiliary section 14. Transmission 10 is housed within a housing H and includes an input shaft 16 driven by a prime mover, such as diesel engine E, through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28, which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48 fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64, as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks 60A, 62A and 64A, respectively, associated with the shift housing assembly 70, as is well known in the prior art. Clutch collars 60, 62 and 64 may be of the well-known synchronized or non-synchronized double-acting jaw clutch type.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction that it must be considered a low or "creeper" gear, which is utilized only for starting of a vehicle under severe conditions and is not usually utilized in the high transmission range. Accordingly, while main transmission section 12 does provide five forward speeds, it is usually referred to as a "4+1" main section, as only four of the forward speeds are compounded by the auxiliary range transmission section 14 utilized therewith.

Jaw clutches 60, 62, and 64 are three-position clutches in that they may be positioned in the centered, non-engaged position as illustrated, or in a fully rightwardly engaged or fully leftwardly engaged position by means of a shift lever 72. As is well known, only one of the clutches 60, 62 and 64 is engageable at a given time, and main section interlock means are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86, while auxiliary section countershaft gears 84 are constantly meshed with output gear 88, which is fixed to transmission output shaft 90.

A two-position synchronized jaw clutch assembly 92, which is axially positioned by means of shift fork 94 and the range section shifting actuator assembly 96, is provided for clutching either gear 86 to mainshaft 28 for low-range operation or gear 88 to mainshaft 28 for direct or high-range operation of the compound transmission 10. The shift pattern for compound range-type transmission 10 is schematically illustrated in FIG. 1B. Selection of low- or high-range operation of the transmission 10 is by means of an operator-actuated switch or button 98, which is usually located at the shift lever 72. Alternatively, a "double-H" type auxiliary shifting device may be utilized.

Although the range-type auxiliary section 14 is illustrated as a two-speed section utilizing spur or helical-type gearing, it is understood that the present invention is also applicable to range-type transmissions utilizing combined splitter/range type auxiliary sections, having three or more selectable range ratios and/or utilizing planetary-type gearing. Also, as indicated above, any one or more of clutches 60, 62 or 64 may be of the synchronized jaw clutch type, and transmission sections 12 and/or 14 may be of the single countershift type.

The single shaft shifting mechanism 100 of the prior art may be seen in greater detail by reference to FIGS. 2–6. The shifting mechanism 100 includes a block member 102 defining a simple socket 104 for forming a ball-and-socket-type connection with either a direct or remote shifting actuator (not shown). Both direct shift actuators, such as shift lever/tower mechanisms utilized with conventional trucks and tractors, and remote shifting actuators of the type utilized with cab-over-engine trucks and tractors, are well known, as may be seen by reference to U.S. Pat. Nos. 3,799,002; 3,934,485; 4,290,515; 4,275,612 and 4,543,843, the disclosures of which are incorporated herein by reference.

Shifting mechanism 100, as described in aforementioned U.S. Pat. Nos. 4,621,537 and 4,920,815, except for the means supporting the shift forks independently of the shift shaft, is substantially structurally and functionally identical to the shifting mechanism of the present invention.

The shifting mechanism 100 is designed for use on a vehicular transmission, such as transmission 10, comprising a number of selectively engageable gear ratios, each designed to be engaged by axial movement of a clutch member into engagement with a corresponding jaw clutch member by means of shift forks, such as shift forks 60A, 62A, and 64A. The shift forks are effective to axially position a selective one of the clutch collars in opposite axial directions from the centered non-engaged positions thereof, as illustrated in FIG. 1.

The shifting mechanism 100 includes a shaft 106 mounted in housing H for rotation about and axial movement along its axis 108. To this end, shaft 106 is provided with reduced diameter portions 110 and 112 mounted on needle roller bearings 114 and 116 provided in the housing H.

Shaft 106 supports the three shift forks 60A, 62A and 64A. Each of the shift forks includes a hub-like portion 118, 120, and 122, provided with a through bore 124, 126 and 128, respectively, through which the shaft 106 is received. The inner bores are of a diameter 130 slightly greater than the outer diameter 132 of the central portion 134 of shaft 106.

The shifting mechanism 100 also includes a first (or shifting) set of teeth projecting radially outwardly from the shaft outer diameter 136 and being axially and circumferentially fixed relative to shaft 106. The shifting teeth are arranged on the shaft 106 so that each of the hubs 118, 120, and 122 fits axially between two adjacent teeth. Accordingly, in the arrangement shown, there are four shifting teeth, 138, 140, 142 and 144. For conveniently forming the teeth, provision is made for a shifting tooth key 146, received in a corresponding axially extending groove 148, provided in the central portion 134 of the shaft 106. The teeth 138, 140, 142, and 144 project from the same side of key 146, the base section of which key is received in the groove 148.

The shifting mechanism 100 also includes a second (or interlock) set of teeth further projecting radially outwardly from the center portion 134 of shaft 106 and being circumferentially fixed thereto but axially movable relative thereto. The second or interlocking set of teeth is axially movable relative to the shaft 106 and is axially fixed relative to the housing H. As with the first set of teeth, each of the hubs is arranged between two adjacent interlocking teeth. The interlocking set of teeth includes teeth 150, 152, 154 and 156. As may be seen by reference to FIG. 5, the interlocking teeth are provided on a single interlocking key 158, having a base portion 160 slidably received in an axially extending groove 162 provided in the shaft 106. Preferably, grooves 148 and 162 are diametrically opposed on the shaft 106. As the axially outer ends 164 and 166 of the interlock keys 150 and 156, respectively, are designed to abut with surfaces 168 and 170 of the transmission housing H, all of the interlock teeth defined by key 160 are axially fixed relative to housing H.

Each of the hub portions 118, 120 and 122 of the shift forks 60A, 62A, and 64A, respectively, is provided with a plurality of grooves extending radially outwardly from the inner diameter bore surfaces thereof and extending axially through the entire axial extent of each of the hub portions. Accordingly, the grooves may be provided by the relatively inexpensive and accurate manufacturing technique of broaching.

Each of the grooves is of a dimension such that when circumferentially aligned with one of the shifting or interlock keys, the aligned key may be received within the groove, allowing relative axial movement between the hub and the aligned tooth.

Hub portion 118 of shift fork 60A, as may be seen by FIG. 6, is provided with a groove 174 and a double-width groove 176. Hub portion 120 of shift fork 62A is provided with grooves 178, 180 and 182. Hub portion 122 of shift fork 64A is provided with groove 184 and a double-width groove 186.

Axial displacement and rotation of shaft 106 relative to housing H are controlled by a remote or direct shifting actuator (not shown) acting on the socket connector of block member 102, which is axially and rotationally fixed to the shaft 106 as by set screw 188. It is noted that the shifting tooth carries a projection 190 for a seat within a notched 192 provided in the block member 102, whereby the key 146 and the shift teeth 138, 140, 142 and 144 are axially fixed relative to shaft 106. It is also noted that interlock key 158 carries a plurality of outwardly extending, semi-annular recesses 194 for interaction with a spring-biased detent ball 196 carried by a detent mechanism 198 of the block member 102 for providing an indication of axial movement of the shaft 106 relative to the housing from the neutral center position thereof to an axially displaced in-gear position thereof. Other than the resilient interaction between the detent wall 196 and the recesses 194, the interlock key 158 is fully axially movable relative to the shaft 106 and the block mechanism 102 axially fixed to shaft 106.

The grooves in the various hub portions of the various shift fork members are arranged such that, for each of the three selection positions of the shifting mechanism 100, the grooves of all of the hub portions except that hub portion to be axially moved are in circumferential misalignment with the interlock teeth, while one of the grooves in the hub portion of the shift fork to be axially moved is aligned with the interlock teeth, allowing that shift fork to be axially moved relative to the housing. Further, at least one groove in the hub portions of all the shift forks (except that shift fork to be axially moved) is aligned with the shifting teeth, allowing the shaft 106 to be axially moved relative to those shift forks, while none of the grooves on the hub portion of the shift fork to be axially moved is aligned with the shifting teeth, whereby that shift fork will be axially engaged by the shift teeth on both axial sides thereof for axial movement with the shift shaft 106.

The interaction of the various teeth and grooves may be seen by reference to FIGS. 4A–4C. FIGS. 4A–4C define a 3×3 matrix showing the relative positions of the interlock teeth, shifting teeth and grooves of the hub portion for various operating conditions of the shifting mechanism 100. The first row illustrates hub portion 122 for various rotational positions of shift shaft 106. The second row illustrates hub portion 120 for various rotational positions of shift shaft 106, and the third row illustrates hub portion 118 for the various rotational positions of shift shaft 106. The first column illustrates the position of the shift shaft 106 in the selection position for engaging and disengaging either the reverse or low speed gear ratios. The second column illustrates the position of shift shaft 106 for engaging or disengaging either the first or second speed gear ratios. The third column illustrates the position of shift shaft 106 relative to the various hub portions of the shift shaft in the shift shaft position for engaging or disengaging either third or fourth speed gear ratios. The various views shown in FIGS. 4A–4C are sectional views taken from the rear of the transmission or shifting mechanism, as seen in FIG. 1.

By way of example, assuming the operator has rotationally positioned shaft 106 for selection of engagement or disengagement of either first or second speed gear ratios, the shaft 106 will be rotationally positioned as illustrated in the second column. In this position, the interlock teeth 156 and 154 will not be in alignment with groove 184 of the hub portion 122 and, thus, the shift fork 64A will be axially locked relative to the housing H. Similarly, interlock teeth 152 and 150 will not be in alignment with groove 174, and the shift fork 60A will be axially locked relative to housing H. Interlock teeth 154 and 152 will be axially aligned with groove 178 of hub portion 120 of shift fork 62A, allowing shift fork 62A and the clutch member 62 to be axially moved relative to the housing H for engagement or disengagement of either gear 52 or 54 to main shaft 28. Shifting teeth 144 and 142 will align with groove 186 in hub portion 122, and shifting teeth 140 and 138 will align with groove 176 in hub portion 118, allowing the shaft 106 to be axially moved relative to the shift forks 60A and 64A, which are now held axially fixed relative to the housing by action of the interlock teeth. Shifting teeth 142 and 140 will not align with either groove 180 or 182 in hub portion 120 of shift fork 62A, thereby fixing the shift fork 62A for axial movement with the shaft 106. In a similar manner, as may be seen by reference to the rightward column in FIGS. 4A–4C, rotating the shaft 106 for selecting engagement or disengagement of third or fourth speed ratios will result in interlocking hub portions 122 and 120 of shift fork 64A and 62A to the housing, while axially fixing hub portion 118 of shift fork 60A to the shaft 106 for axial movement therewith. Also, as may be seen by reference to the leftwardmost column of FIGS. 4A–4C, rotating the shaft 106 to the position for selecting engagement or disengagement of the low or reverse ratios will result in interlocking the hub portions 120 and 122 of shift fork 62A and 64A to the housing, while axially fixing the hub portion 122 of shift fork 64A to the shaft 106 for axial movement therewith.

While the single shaft shifting mechanism of the present invention is illustrated in connection with a five-forward-speed, one-reverse-speed main transmission section 12, such mechanisms also could be utilized with transmissions having a greater number of selectable ratios by the provision of additional shift fork and hub assemblies and proper positioning of the groove in each of the hub assemblies.

As may be seen, hub portion 122 is also provided at its forward end with a pair of axially extending surfaces 200 and 202, which will interact with the shifting tooth 142 and the interlock tooth 154, respectively, to limit the clockwise and counterclockwise rotation, respectively, of the shaft 106 relative to housing H, as viewed from FIG. 4. Briefly, shift tooth 142 will engage surface 200 to limit the clockwise rotation of shaft 106 to the position whereat the shaft 106 is correctly positioned for selection of engagement of the low or reverse speed ratios and, thus, will provide the operator with a positive means of confirming that he has properly reached this position. Similarly, interlocking tooth 154 will engage surface 202 to limit counterclockwise rotation of the shaft 106, as viewed in FIG. 4, to provide the operator with a positive indication that he has correctly positioned the shaft 106 for selection of engagement or disengagement of the third and fourth speed gear ratios. The hub portion 122 is also provided with a spring-biased plunger member 204, which will interact with a surface 206 provided on shaft 106. Briefly, as may be seen from the middle column in FIG. 4, spring-biased plunger 204 will just engage surface 206 when the shaft 106 is rotationally positioned for proper selection of engaging the first and second speed gear ratios and, thus, will provide the operator with a positive indication of having properly positioned the shaft 106 for such selection. Further, plunger 204 provides the well-known resistance to selection of low and reverse speed and will tend to force the transmission out of such a selection position upon release of the shift lever.

Referring to FIG. 2, the shifting mechanism 100 also may include various additional sensors or sensor-actuating structures for cooperation with sensing devices provided in the housing, as is well known in the prior art. For example, reduced diameter portion 112 of shaft 106 may include a first ramp notched 208, designed to interact with a plunger 210, provided in the housing H to actuate a neutral start safety switch 212. Reduced-diameter portion 112 may include a second ramped notch 214 for cooperation with a plunger 216 provided in housing H for the operation of an auxiliary transmission shifting control valve 218. Hub portion 122 of shift fork 128 may include a projection 220 for operation of a reverse of backing light switch 222. Hub portion 118 of shift fork 60A may include a protrusion 224 which will engage a sensor 226 when the shift fork is moved leftwardly, as seen in FIG. 2, for engagement of the high speed for operation of a road speed governor valve 226 or the like.

As indicated above, the various in-gear, in-neutral detent mechanisms, the various stop mechanisms and the mechanisms for indicating that the shaft 106 has been rotated into the various rotational selection positions thereof are all integral with the mechanism 100, allowing the mechanism 100 to be utilized with any standard shift actuator adapted to be received in the socket 104 of block member 102 without requiring any special modifications of the shift actuator mechanism.

As indicated in aforementioned copending U.S. patent application Ser. No. 08/636,097, the shift and/or interlock key may be replaced by pin members or the like.

FIGS. 7A–7B illustrate a potential drawback to the prior art shifting mechanism 100. As may be seen, shift shaft 106 passes through a through bore 120A in the hub portion 120 of the shift fork 62A and supports the entire weight of the shift fork. The weight of the fork will cause the upper portion of bore 120A to be urged into frictional contact with the upper surface of shaft 106, creating a frictional resistance to rotational and/or axial movement of the shaft 106 relative to the hub 120.

FIGS. 8A, 8B and 9 illustrate the single shaft shifting mechanism 300 of the present invention. As indicated above, except for the use of members independent of the shift shaft to support at least a portion of the weight of the shift forks, the mechanism 300 may be substantially functionally and structurally identical to mechanism 100, described above. Elements of mechanism 300 substantially structurally and/or functionally identical to elements of mechanism 100 will be assigned like reference numerals and will not be redescribed in detail.

Mechanism 300 includes a shift shaft 106 having a shift key and an interlock key 156 and carrying a shift block member 102 defining a socket 104. Shift forks 302, 304 and 306 are associated with clutches 60, 62 and 64, respectively, and include hubs 118, 120 and 122, respectively. The shift fork hubs are provided with a through bore 120A for receiving the shift shaft 106. Additionally, the shift forks 302, 304 and 306 each define a pair of support through bores 302A and 302B, 304A and 304B, and 306A and 306B, which slidably receive support rods 308 and 310 fixed to the transmission housing. As may be seen by reference to FIGS. 8A and 8B, the rods 308 and 310 support the weight of the shift forks such that the inner diameter surface of the through bore 120A is not urged into frictional contact with the outer diameter surface of shift shaft 106. Of course, other means for supporting the weight of shift forks in the housing, while not impeding relative axial movement therebetween, may be utilized.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A single shaft shifting mechanism (300) for selection and engagement of selectable gear ratios in a change-speed transmission, said mechanism comprising a housing, a shift shaft mounted for relative axial and rotational movement in said housing, a block member axially and rotationally connected to said shaft, a plurality of shift forks, each including a sleevelike hub portion having a first through bore therethrough for receipt of said shift shaft, said mechanism characterized by:

support means independent of said shift shaft for supporting said shift forks in said housing.

2. The mechanism of claim 1 wherein said support means comprises at least one support shaft (308, 310) extending parallel to said shift shaft and slidably received in second through bores (302A, 302B, 304A, 304B, 306A, 306B) provided in said shift forks.

* * * * *